Figure 1:
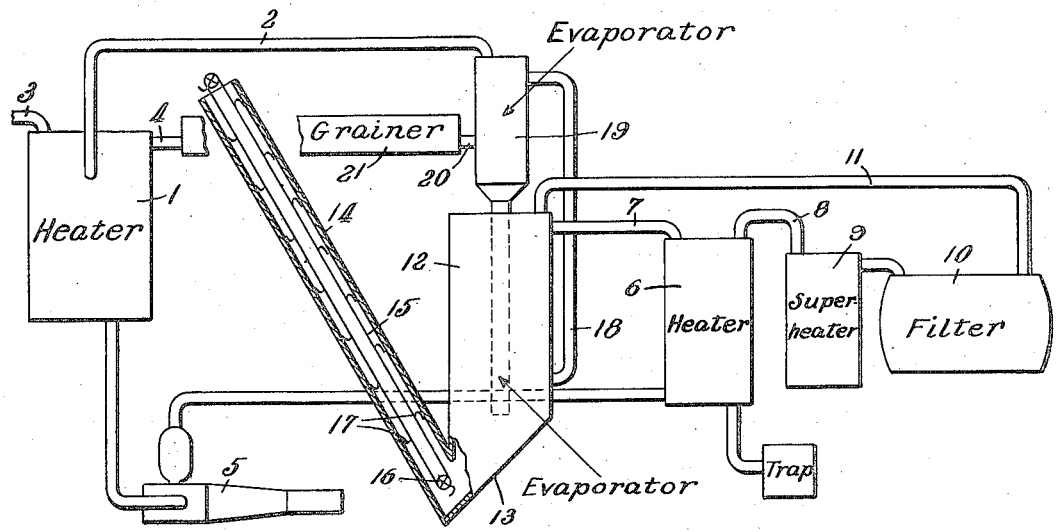

C. L. WEIL.
APPARATUS FOR MAKING SALT.
APPLICATION FILED SEPT. 8, 1911.

1,091,721.

Patented Mar. 31, 1914.

Inventor
Charles L. Weil

Witnesses
H. G. Robinette
H. Schoenthal

By Archibald Cox.
Attorney

UNITED STATES PATENT OFFICE.

CHARLES L. WEIL, OF ST. CLAIR, MICHIGAN, ASSIGNOR TO DIAMOND CRYSTAL SALT COMPANY, OF ST. CLAIR, MICHIGAN, A CORPORATION OF MICHIGAN.

APPARATUS FOR MAKING SALT.

1,091,721.  Specification of Letters Patent.  Patented Mar. 31, 1914.

Original application filed May 31, 1911, Serial No. 630,287. Divided and this application filed September 3, 1911. Serial No. 648,288.

*To all whom it may concern:*

Be it known that I, CHARLES L. WEIL, a citizen of the United States, residing at St. Clair, in the county of St. Clair and State of Michigan, have invented certain new and useful Improvements in Apparatus for Making Salt, of which the following is a specification.

This invention relates to apparatus for making salt; and it comprises an organization of apparatus elements useful in making salt and comprising means for transmitting brine successively through a preliminary heater, a pressure-producing pump, a second preliminary heater, a filter, a plurality of "flash" or self-evaporative evaporators wherein salt is produced and a final graining pan; and it also comprises certain details of said apparatus: all as more fully hereinafter set forth and as claimed.

In the manufacture of salt, it is desirable to have a full control of the size of grain, a maximum evaporative efficiency in the apparatus employed and the possibility of securing a high output of crystallized salt from an apparatus of comparatively moderate size.

The object of the present invention is to secure these results. For this purpose I rearrange the conditions of evaporation and the apparatus therefor in such a manner as to secure a methodical utilization of heat while allowing the apparatus and operation to be under full control at all times.

I advantageously supply the evaporating system with fresh brine and with tail brine from the apparatus itself in such proportion as will secure an evaporation to the exact extent desired in the material passing through the system. In an advantageous embodiment of the present invention, a mixture of tail brine, coming from an apparatus later described, with fresh brine is transmitted through a preheater which is advantageously supplied with vapors from self-evaporation or "flash" evaporation occurring later in the system. This preheater is on the suction side of a pump adapted to deliver brine under some pressure. From the pump the brine goes into a second preheater where it is further heated by vapors from self-evaporation later in the system. From this second preheater, the brine may now go to a third heater where it may be heated with live steam, as the brine is under pump pressure, to any temperature desired. It may, for instance, be heated to 260° F. or above, according to conditions and the amount of self-evaporation later desired. Being heated under pressure, there is a tendency for the deposition of gypsum and other impurities. These may be separated by passing through a filter. From the filter, the superheated brine goes forward to a plurality of self-evaporators or "flash" evaporators. Two may be used. In these self-evaporators, the pressure is reduced in a plurality of stages. The vapors from the first self-evaporator may be used to heat the second preliminary heater, while those from the second self-evaporator, which is at a lower temperature, may be used for heating the first preliminary heater. The first self-evaporator is advantageously of a special type, having a salt leg and boot, provided with a conveyer. This leg should extend upwardly sufficiently far to allow the pressure of the liquid in it to counterbalance the pressure prevailing in this first self-evaporator. From the second self-evaporator, the concentrated brine may be passed into a graining pan which may be any of the ordinary types; but is preferably of a special type provided with air agitating means for controlling the size of salt grain produced. Air may be introduced into the solution in a plurality of minute jets, keeping it agitated and controlling the size of the grain, while at the same time aiding in evaporation. The residual or tail brine from this pan may be sent to the first preliminary heater after being admixed with sufficient fresh brine to bring the total concentration to such a point as will allow the exact amount of evaporation desirable in the brine passing through the system to the graining pan.

As saturated brine boils at about 226° F. under ordinary atmospheric pressure, if the brine has been preliminarily heated to 260° F., there is a drop in temperature of the brine of about 34°, accompanied with a corresponding evaporation of water; "flash" evaporation or self-evaporation. Where a plurality of self-evaporators are employed, this evaporation and resulting drop in temperature is divided up among them. Passing the self-evaporated brine of 226° F. into the pan, further evaporation now takes place and the cooled brine passing as tail brine into the first preliminary heater may have a temperature of about 200° F. While the vapor from brine boiling at 226° F. at ordinary pressure expands and cools to 212° F., where, as in the present invention, the release of the vapor is under pressure, this drop in temperature does not take place to such an extent. This is of importance in the present invention since more heat units can be carried by the hotter vapor. If the pressure on the brine in the self-evaporator be released so as to bring the temperature of the brine from, say, 260° F. to 245° F., steam of a temperature of 231° will be available which may be utilized in heating the same amount of brine to a higher temperature with the same amount of heating surface than can be caused by an evaporator flashing steam at 212° F.

In the accompanying illustration, there is shown more or less diagrammatically an organization or system of apparatus elements useful in performing the process above described, and for other purposes.

Figure 2:
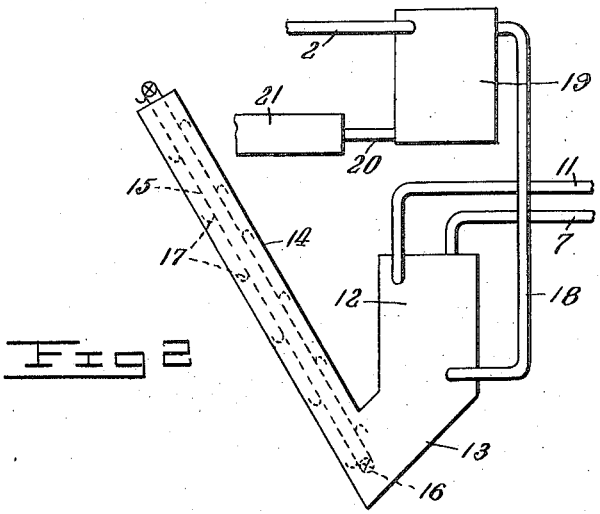

In this showing Figure 1 is a complete installation: and Fig. 2 is a fragmental view of a modification.

Element 1 is the first preheater. It may be of any ordinary structure; such as that common in heat interchangers, and heating vapor may pass either around or inside the tubes of a tube nest (not shown). Heating vapor is supplied by vapor line 2. Fresh brine which may have advantageously been heated enters through pipe 3 while tail brine from the graining pan enters through pipe 4. The relative proportions of fresh brine and of tail brine may be controlled as desired. From this first preheater, the brine is taken by pump 5 which delivers it under some pressure into the second preheater 6. The first preheater is on the suction side of the pump and the second on the pressure side. The amount of pressure may be as desired. The second preheater is supplied with self-evaporation steam through pipe 7, coming from the first self-evaporator in series. Heated brine goes out through conduit 8, to superheater 9 which may be supplied with live steam. All these heaters may be, like the first mentioned heater, of the ordinary heat interchanger type. In this superheating operation there is generally a deposit of gypsum and other impurities and the heated liquid is best next passed through a filter 10, which may be a cylindrical vessel or casing partly filled with small stones which present a large amount of surface for the deposit of gypsum or calcium sulfate, and other impurities, carried by the superheated brine. From this filter the brine, which may be at a temperature of 260° F. or above, passes through conduit 11 to the first self-evaporator 12. As shown, this self-evaporator is of a particular type. As shown, it is provided with a bottom 13 forming the boot of elevating means 14, which consists of a tube, which may be of rectangular cross section, closed except at the top, and provided with conveying mechanism, which may be composed of chain 15, sprocket wheels 16 and buckets 17 carried by the chain. The height of this tube should be sufficient to allow the weight of the brine therein to counterbalance the pressure within the self-evaporator. Vapor released in this first self-evaporator is carried through a suitable conduit (7) to the second preheater previously described. The self-evaporated and somewhat concentrated brine leaves this self-evaporator through brine main 18 going to a second self-evaporator 19. In this second self-evaporator another drop in temperature and pressure is allowed with a result of a further concentration and the liberation of vapors. These vapors pass through a vapor line (2) to the first preheater described. Brine is led from this self-evaporator through conduit 20 to a graining pan 21 which may be provided with air stirring means (not shown). Tail brine from this pan goes into the first preheater as previously described. As there is, or may be, some formation of grain salt in this second self-evaporator 19, it is useful to provide it with a depending leg 22 passing down into the first self-evaporator and allowing the discharge of grain salt into the latter. It is however possible, as shown in Fig. 2, to make the two self-evaporators independent.

In the present application I do not claim the described process of treating brine in graining salt this forming the subject matter of my co-pending application, Ser. No. 630,287 filed May 31, 1911, whereof the present application is a division.

What I claim is:—

1. In a salt-making system, the combination of a brine preheater, another heating means, means for delivering heated brine under pressure to the other heating means, means for producing self-evaporation of the heated brine in a plurality of stages, means for removing salt deposited in such a stage, and means for returning the vapors of self-evaporation from one such stage to the brine preheater.

2. In a salt-making system, the combination of a brine preheater, subsequent means for further heating in a plurality of stages, means for delivering heated brine under pressure to said subsequent means, means for producing self-evaporation of the heated brine in a plurality of stages, means for removing salt deposited in such a stage, means for returning the vapors of self-evaporation from one such stage to the brine preheater and means for returning the vapors from another such stage to serve in a stage of the subsequent heating.

3. In a salt-making system, the combination of a brine preheater, a pump delivering brine therefrom to a series of successive subsequent heaters and a plurality of successive subsequent self-evaporating devices, one of such devices being provided with a salt delivering leg extending upward a sufficient distance above its bottom to provide a brine column counterbalancing pressure therein.

4. In a salt-making system, the combination of a brine preheater, a pump delivering brine therefrom to a series of successive subsequent heaters and a plurality of successive subsequent self-evaporating devices, one of such devices being provided with a salt delivering leg extending upward a sufficient distance above its bottom to provide a brine column counterbalancing pressure therein and another such device having a salt-delivery leg extending into the first-stated device.

5. In a salt-making system, a brine preheater, a pump removing brine therefrom, a second preheater, a third preheater adapted to heat to a high temperature, a pair of successive pressure-releasing and evaporating devices, means for removing salt deposited in such a device, connections taking the vapors from one such device to the preheater and connections taking vapors from the other such device to the second preheater.

6. In a salt-making system, a brine preheater, a pump removing brine therefrom, a second preheater, a third preheater adapted to heat to a high temperature, a pair of successive pressure-releasing and evaporating devices, means for removing salt deposited in such a device, connections taking the vapors from one such device to the preheater, connections taking vapors from one such device to the second preheater and a graining pan in liquid-receiving relation to the second pressure-releasing device.

7. In a salt-making system, a brine preheater, a pump removing brine therefrom, a second preheater, a third preheater adapted to heat to a high temperature, a pair of successive pressure-releasing and evaporating devices, means for removing salt deposited in such a device, connections taking the vapors from the other such device to the preheater, connections taking vapors from the other such device to the second preheater and a graining pan in liquid-receiving relation to the second pressure-releasing device, said graining pan being in liquid-discharging relation to said brine preheater.

8. In a salt-making system, means for preheating brine by self-evaporation vapors, means for placing the brine therefrom under pressure, means for further heating said brine under pressure, means for releasing the pressure in a plurality of stages to produce self-evaporation vapors, means for removing salt deposited in such a stage, connections to return vapors from one such stage to the preheating means and connections to return the vapors from another such stage to aid in said further heating.

9. In a salt-making system, means for preheating brine by self-evaporation vapors, means for placing the brine therefrom under pressure, means for further heating said brine under pressure, means for releasing the pressure in a plurality of stages to produce self-evaporation vapors, connections to return vapors from one such stage to the preheating means, connections to return the vapors from another such stage to aid in said further heating and means for removing salt from a pressure-releasing device without disturbing pressure relations therein.

10. In a salt-making system and in successive connected arrangement, a brine preheater, a pump for delivering preheated brine under pressure, a second preheater, a third preheater adapted for heating by live steam, a pressure releaser, means for removing salt from said releaser, a second pressure releaser and a graining pan, there being vapor connections between the second pressure releaser and the heating elements of the preheater and vapor connections between the second pressure releaser and the second preheater.

In testimony whereof, I affix my signature in the presence of two subscribing witnesses.

CHAS. L. WEIL.

Witnesses:
 THEO. J. SCHLINKERT,
 GEORGE A. SCHWAB.